United States Patent [19]

Toot

[11] 4,227,443

[45] Oct. 14, 1980

[54] FAIL-FIXED SERVOVALVE

[75] Inventor: Peter D. Toot, West Chester, Ohio

[73] Assignee: General Electric Company, Cincinnati, Ohio

[21] Appl. No.: 945,165

[22] Filed: Sep. 25, 1978

[51] Int. Cl.[3] .......... F16B 13/044

[52] U.S. Cl. .......... 91/459; 91/3; 137/625.61; 137/625.62; 137/625.64; 137/625.69

[58] Field of Search .......... 93/3, 459; 137/625.69, 137/625.61, 625.64, 625.62

[56] References Cited

U.S. PATENT DOCUMENTS

| | | | |
|---|---|---|---|
| 3,027,917 | 4/1962 | Orloff | 137/625.61 |
| 3,028,880 | 4/1962 | Reitman | 137/625.61 |
| 3,065,145 | 11/1962 | Molander, Jr. et al. | 137/625.62 |
| 3,922,955 | 12/1975 | Kast | 137/625.62 X |

*Primary Examiner*—Irwin C. Cohen
*Attorney, Agent, or Firm*—Carl L. Silverman; Derek P. Lawrence

[57] ABSTRACT

A fail-fixed servovalve is provided for use in a digital control system. The servovalve is comprised of a deflecting means which deflects a jet pipe in response to an electrical input signal. Fluid flowing through the jet pipe causes a spool to translate within a sleeve, thereby allowing pressurized fluid to flow through selected ports within the sleeve to control the movement of an output piston. The output of the servovalve is essentially linear over the primary range of digital input currents with the output being zero when the input current is either zero or in excess of the maximum rated current for the servovalve.

8 Claims, 6 Drawing Figures

FAIL-FIXED SERVOVALVE

BACKGROUND OF THE INVENTION

The Government has rights in this invention pursuant to Contract No. N00019-76-C0423 awarded by the Department of the Navy.

FIELD OF THE INVENTION

This invention relates to a fail-fixed servovalve and, more particularly, to a fail-fixed servovalve which is particularly suitable for in a pulse width modulation digital system.

DESCRIPTION OF THE PRIOR ART

Servovalves of the electrohydraulic type have been widely used as an interface between electrical control systems and mechanical or hydraulic metering or actuating devices. For example, in a gas turbine enging fuel control system an electrical signal generated by a fuel control computer may be applied to the input of a servovalve. In response to the electrical signal, the servovalve controls a servopiston which generates a mechanical output signal for controlling the position of a fuel metering valve. The servovalve thus provides for highly stable and accurate control of engine fuel flow.

Due to the widespread use of such servovalves in particularly critical control systems, such as gas turbine engine fuel control systems, it is necessary that the servovalves be fail fixed. By fail fixed, it is meant that the mechanical output of the servopiston, which is provided to an actuator or metering device, for example a fuel metering valve, be locked in position, or fixed, immediately following a loss of the electrical input signal.

Existing fail-fixed servovalves operate utilizing bipolar input currents; and is, the servopiston moves in one direction when positive current is received by the servovalve and moves in the opposite direction when negative current is received by the servovalve. For zero current and for a surrounding deadband region of approximately ±12.5% of rated current the servopiston is essentially locked in position with slight movements due to fluid leakage. Although the prior art fail-fixed servovalves are adequate for many applications, the inherent deadband range and the unpredictable leakage drift of the servopiston within this range have made them unsuitable for certain digital control applications in which the input current is in the form of square pulses alternating between zero and positive rated current.

SUMMARY OF THE INVENTION

It is, therefore, an object of the present invention to providea fail-fixed servovalve which is compatible with present pulse width digital control systems.

It is another object of the present invention to provide such a fail-fixed servovalve in which an essentially linear range of the valve is utilized.

It is a further object of the present invention to provide such a fail-fixed servovalve which does not require additional deadband compensation.

Briefly stated, these objects, as well as additional objects and advantages which will become apparent from the following specification and the appended drawings and claims, are accomplished by the present invention which comprises a fail-fixed servovlave having a sleeve with a plurality of ports therethrough, one of which receives an inlet flow of pressurized fluid. A jet pipe receive pressurized fluid from the inlet port and discharges a jet of pressurized fluid into a pair of receiver conduits which are in fluid communication with opposite ends of the sleeve. A deflecting means, responsive to an electrical input signal, deflects the jet pipe such that the conduits receive equal amounts of jet pipe fluid when the jet pipe is in a balanced flow deflected position. When the jet pipe is located between a nondeflected position and the balanced flow deflected position, more of the jet pipe fluid is discharged into a first receiver conduit and when the jet pipe is located between the balanced flow deflected position and the fully deflected position, more of the jet pipe fluid is discharged into the second receiver conduit. A spool disposed within the sleeve to axially translate in the direction of lower sleeve end pressure includes a plurality of circumferentially relieved areas interspaced between a plurality of circumferential lands. The movement of the spool within the sleeve causes selected relieved areas to interconnect selected sleeve ports for delivering pressurized fluid on one side of a piston and for porting pressurized fluid away from the other side of the piston. Pressurized fluid is delivered to a first side of the piston and is ported away from the second side of the piston when the spool translates between a position near a first end of the sleeve and the midpoint of its axial stroke within the sleeve. Pressurized fluid is delivered to the second side of the piston and is ported away from the first side of the piston when the spool translates between a position near the second end of the sleeve and the midpoint of its axial stroke within the sleeve. No pressurized fluid flows to or from the piston when the spool is located near either end of the sleeve or is at the midpoint of its axial stroke within the sleeve.

DESCRIPTION OF THE PREFERRED EMBODIMENT

Figure 1:
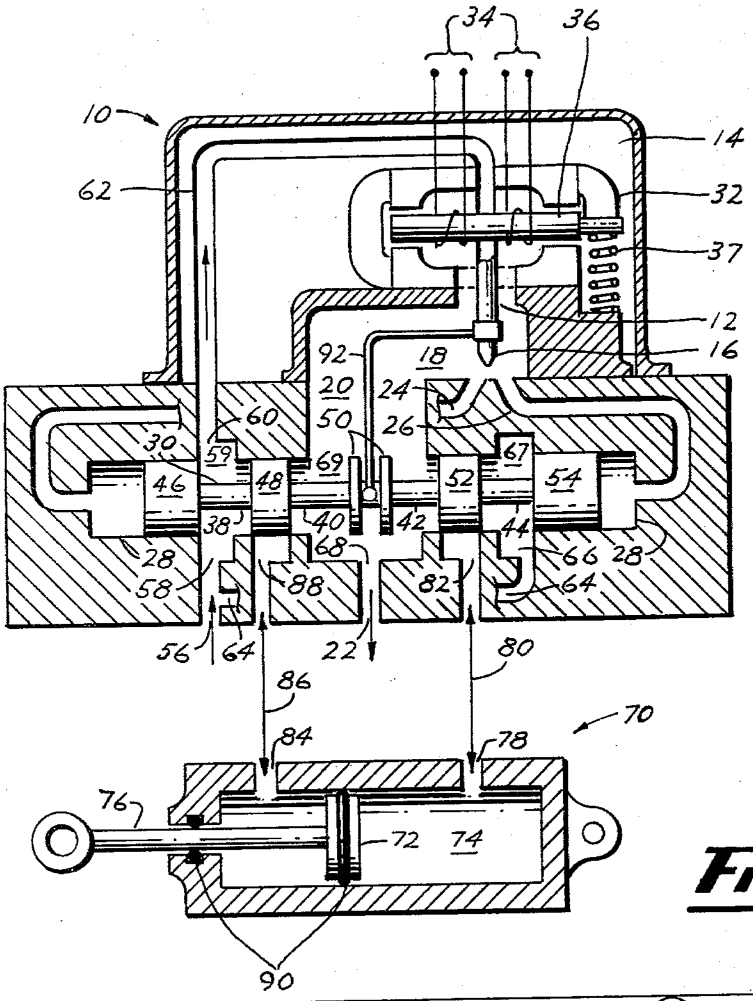
FIG. 1 shows a cross-sectional view of the fail-fixed servovalve of the present invention.

Referring now to FIG. 1, there is depicted a fail-fixed servovalve, shown generally as 10, comprising a flexible jet pipe 12 mounted in a housing 14. The jet pipe 12 receives a flow of pressurized fluid, which may be any suitable servo or hydraulic fluid, for discharge through a relatively small area nozzle 16 into a chamber 18. The chamber 18 has an outlet 20 which is connected by way of a return conduit 22 to a low pressure fluid sump (not shown). The pressure drop across the nozzle 16 causes the discharge of a high velocity jet of fluid into the chamber 18. A pair of receiver conduits 24 and 26 are disposed within the housing 14 to receive the jet pipe fluid and are connected in flow communication with opposite ends of a sleeve 28 in which a spool 30 is translatably disposed. A deflecting means, shown in this embodiment as a single-sided torque motor 32, is provided by deflecting the jet pipe 12 in response to an electrical input signal received through a plurality of lines collectively designated as 34. An armature 36 of the torque motor 32 is secured to the jet pipe 12 and exerts a bending movement thereon, deflecting the jet pipe 12 to the left as viewed in FIG. 1, the deflecting force increasing proportionally as the magnitude of the average torque motor current increases from zero to a maximum torque motor rated current. A bias signal 37 is attached to the armature 36 to provide a restoring force which tends to bring the jet pipe 12 back to the center of its axial stroke at null current as shown in FIG. 1. Null current as used herein means approximately one-half of the rated current on a time average basis. Thus, null current could be a direct current of one-half of rated current or any alternating current with an average value of one-half of the rated current, provided the frequency is high enough so that the torque motor has negligible response.

The spool 30 includes a plurality of circumferentially relieved areas 38, 40, 42 and 44 which are interspaced between a plurality of circumferential lands 46, 48, 50, 52 and 54. A supply conduit 56 furnishes a supply of pressurized fluid by way of an inlet port 58 from a source (not shown) to an annular space 59 defined by relieved area 38 and an annular groove within the sleeve 28.

The pressurized fluid exits from the space 59 by way of an exit port 60 which is in fluid communication with a conduit 62 which, in turn, supplies the pressurized fluid to the jet pipe 12. Pressurized fluid also flows from the supply conduit 56 via a connecting conduit 64 through an inlet port 66 to an annular space 67, defined by relieved area 44 and an annular groove within the sleeve 28. An outlet port 68 in the sleeve 28 provides fluid communication whereby fluid within an annular space 69, defined by relieved areas 40 and 42, land 50 and an annular groove within the sleeve 28, is returned via the return conduit 22 to the low pressure fluid sump (not shown).

There is also provided a servopiston unit, shown generally as 70, which includes a piston 72 disposed for translation within a bore 74. Extending from the piston 72 is a connecting rod 76, which may be connected to a metering or actuation device (not shown). The head side of the piston 72 receives and returns fluid through a port 78 which is in fluid communication, via an interconnecting conduit 80, with a port 82 in the sleeve 28. In a like manner, the rod side of the piston 72 receives and returns fluid through a port 84 which is in fluid communication via an interconnecting conduit 86 to a port 88 in sleeve 28. O-ring seals 90 may be provided to prevent fluid leakage from the bore 74.

A feedback spring 92 is attached to the jet pipe 12 at one end, the other end being attached to the center land 50 on the spool 30. The purpose of the feedback spring 92 is to provide a restoring force to move the jet pipe 12 to the null position once the spool 30 has translated either to the left or to the right a distance from the null position which is proportional to the variation in time average torque motor current from null current.

OPERATION OF THE PREFERRED EMBODIMENT

As has been hereinbefore stated, FIG. 1 depicts the fail-fixed servovalve in the null condition wherein the torque motor 32 is receiving null current. As is readily apparent from FIG. 1, in the null condition the jet pipe 12 is in a balanced flow deflected position in which equal amounts of jet pipe fluid are provided to each of the receiver conduits 24 and 26. As a result of equal amounts of jet pipe fluid being applied to each of the receiver conduits 24 and 26, the pressure at both ends of the sleeve 28 is the same and the spool 30 is at the center of its axial stroke. In this balanced flow position, which in this embodiment is depicted as a central position, lands 48 and 52 of the spool 30 block ports 88 and 82 respectively, thereby preventing the flow of fluid to or from the servopiston unit 70 and locking the piston 72 in place.

Figure 2:
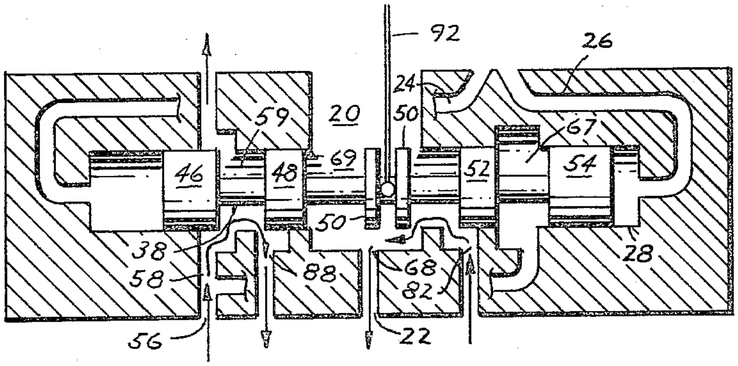
FIG. 2 shows a cross-sectional view of a portion of the fail-fixed servovalve of FIG. 1 in another phase of operation.

As the time average torque motor current is increased above null current, the torque motor 32 deflects the jet pipe 12 to the left, thereby causing more jet pipe fluid to enter receiver conduit 24 than enters receiver conduit 26. As a result of this unequal application of jet pipe fluid, the pressure becomes greater on the left side of the sleeve 28 than on the right side and the spool 30 translates to the right, assuming a position similar to that depicted in FIG. 2. The displacement and actual position of the spool 30 is directly proportional to the change in the time average torque motor current from null current. In the position shown in FIG. 2, a passage means or passage is formed within the sleeve 28, allowing pressurized fluid to flow from the supply conduit 56, through the inlet port 58, through annular space 59, through port 88 and into the interconnecting conduit 86 for application to the rod side of the piston 72. At the same time and in a similar manner another passage means or passage is formed within the sleeve 28, so that pressurized fluid is ported away from the head side of the piston 72 through the interconnecting conduit 80 and port 82, through annular space 69 and through the outlet port 68 to the return conduit 22. The application of pressurized fluid to the rod side and the simultaneous porting away of fluid from the head side causes the piston 72 to translate to the right, the velocity of the movement of the piston 72 being directly proportional to the change in the time average torque motor current from null current.

The movement of the spool 30 to the right causes the feedback spring 92 to restore the jet pipe 12 to the null position, thereby maintaining the spool 30 in the new position, and causing the piston 72 to translate at a constant velocity to the right.

Figure 3:
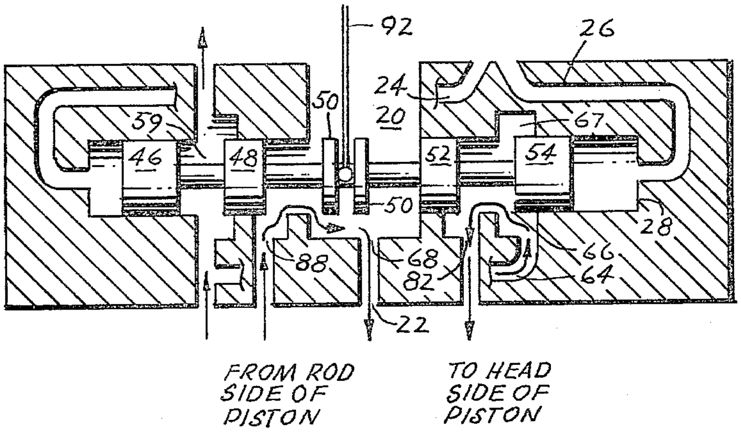
FIG. 3 shows a cross-sectional view of a portion of the fail-fixed servovalve of FIG. 1 in still another phase of operation.

In a like manner, decreasing the average torque motor current below null current deflects the jet pipe 12 to the right, causing the spool 30 to move to the left, assuming a position similar to that depicted to FIG. 3. The passages thus formed within the sleeve 28 allow pressurized fluid to flow to and from the servopiston unit 70 thereby causing the piston 72 to translate to the left. The movement of the spool 30 to the left causes the feedback spring 92 to restore the jet pipe 12 to the null position, thereby maintaining the spool 30 in the new position, and causing the piston 72 to translate at a constant velocity to the left.

Figure 4:
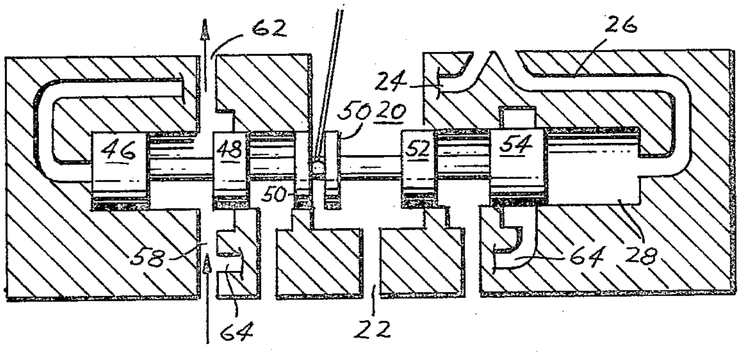
FIG. 4 shows a cross-sectional view of a portion of the fail-fixed servovalve of FIG. 1 in still another phase of operation.
Figure 5:
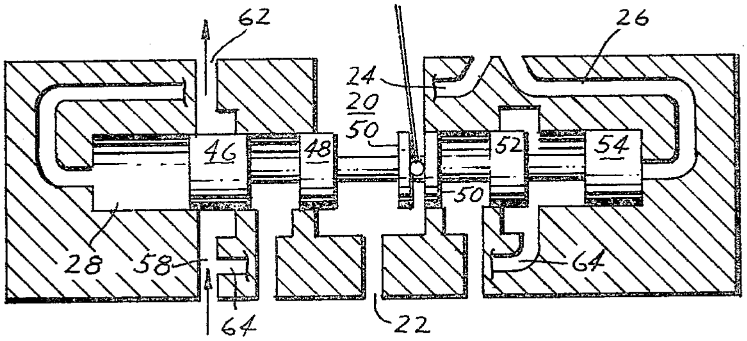
FIG. 5 shows a cross-sectional view of a portion of the fail-fixed servovalve of FIG. 1 in still another phase of operation.

In the event that the time average torque motor current becomes zero or near zero, as for example through the malfunctioning of a control (not shown) or the breaking or other failure of one or more input lines 34, the jet pipe 12 deflects completely to the right to a non-deflected position and a zero hardover condition exists. With the jet pipe 12 in this non-deflected position, more of the jet pipe fluid is provided to receiver conduit 26, thereby causing the spool 30 to translate to the left to a first extreme position within the sleeve 28, as is shown in FIG. 4. At or near this first extreme, the lands 44, 48, 50 and 52 on the spool 30 block the flow of fluid to and from the servopiston unit 70, thereby locking the piston 72 in place. In a like manner, if the time average torque motor current is increased to a value at or near the torque motor rated current or if the current exceeds the rated current, the jet pipe 12 is fully deflected to the left, and an overcurrent hardover condition exists. With the jet pipe 12 in a fully deflected position, more of the jet pipe fluid is provided to receiver conduit 24, thereby causing the spool 30 to translate to the right to a second extreme position within the sleeve 28, as is shown in FIG. 5. At or near this second extreme, the lands 44, 48, 50 and 52 on the spool 30 block the flow of fluid to and from the servopiston unit 70, thereby locking the piston 72 in place.

Figure 6:
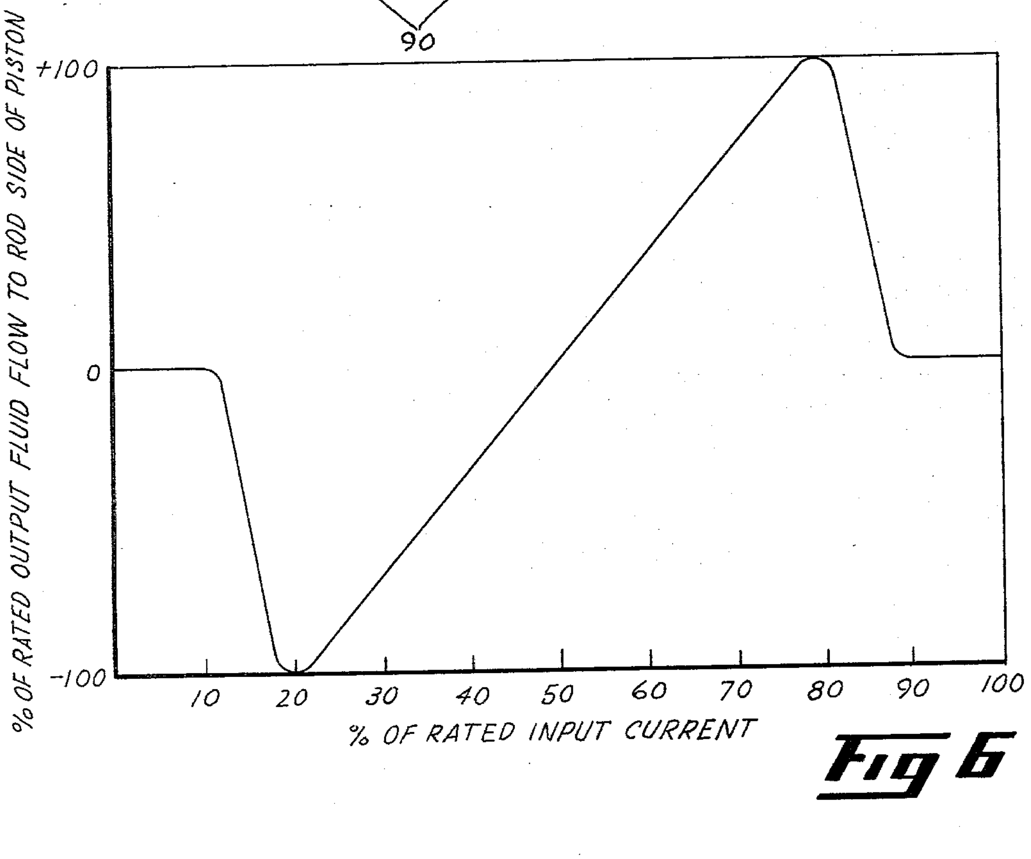
FIG. 6 is a graphical representation of the operation of the fail-fixed servovalve of FIG. 1.

FIG. 6 is a graphical illustration of the output versus input characteristics of the fail-fixed servovalve 10. As is readily apparent, the servovalve output through the primary operating range (between 20% and 80% of rated current) is basically linear with a null position at 50% of rated input current. As described hereinbefore, input currents at or near hardover (zero input current or rated input current) also result in a null output characteristic.

From the foregoing description it can be seen that the present invention comprises a fail-fixed servovalve which is compatible with present digital control systems and which is essentially linear over the primary operating range. It will be recognized by one skilled in the art that changes may be made to the above-described invention without departing from the broad inventive concepts thereof. For example, a flapper valve or diverter plate could be used instead of the jet pipe 12. It is to be understood, therefore, that this invention is not limited to the particular embodiment disclosed, but it is intended to cover all modifications which are within the spirit and the scope of the invention as set forth in the appended claims.

What is claimed is:

1. A servovalve system comprising:

a sleeve having a plurality of ports therethrough, one of said ports receiving an inlet flow of pressurized fluid, at least one of said ports communicating pressurized fluid to a relatively lower pressure sump, and at least two of said ports comprising separate output ports;

a jet pipe for discharging a jet of pressurized fluid received from said inlet port;

means for producing an electrical input signal having rated input current values from zero to a maximum rated value;

deflecting means responsive to said electrical input signal for deflecting the jet pipe;

a pair of receiver conduits in flow communication with opposite ends of the sleeve and disposed to receive fluid discharged from the jet pipe, wherein:

said conduits receive equal amounts of said jet pipe fluid when the jet pipe is in a balanced flow deflected position, a first of said conduits receives more of said jet pipe fluid when the jet pipe is located between a non-deflected position and the balanced flow deflected position, and the second of said conduits receives more of said jet pipe fluid when the jet pipe is located between the balanced flow deflected position and a fully deflected position;

a spool movable solely by fluid pressure and disposed within the sleeve to axially translate in the direction of lower sleeve end pressure, said spool having a plurality of circumferentially relieved areas interspaced between a plurality of circumferential lands;

feedback means connected to said jet pipe and said spool;

a servopiston unit having a piston translatably disposed within a bore, each side of said piston respectively being in fluid communication with one of said two separate output ports in said sleeve; and passage means, formed by the translation of the spool within the sleeve causing selected relieved areas to interconnect selected sleeve ports with said two output ports for:

delivering pressurized fluid to a first side of the piston and porting pressurized fluid away from the second side of the piston when the spool translates between a position near a first end of the sleeve and the midpoint of its axial stroke within the sleeve;

delivering pressurized fluid to the second side of the piston and porting pressurized fluid away from the first side of the piston when the spool translates between a position near the second end of the sleeve and the midpoint of its axial stroke within the sleeve; and delivering no pressurized fluid to and porting no pressurized fluid away from the servopiston unit to lock the unit in place when the spool is located near either end of the sleeve at a respective one of a first and second extreme position or is at the midpoint of its axial stroke within the sleeve;

wherein:

when no electrical input signal is applied to the deflecting means the jet pipe is in said non deflected position and the spool is at the first extreme position within the sleeve;

when an electrical input signal is applied to the deflecting means the jet pipe is in a proportionally deflected position and the spool moves proportionally from the first extreme position toward the second extreme position as the magnitude of the electrical signal is increased; and when a maximum rated electrical input signal is applied to the deflecting means the jet pipe is in said fully deflected position and the spool is at the second extreme position.

2. The servovalve system as recited in claim 1 wherein the deflecting means comprises a single-sided torque motor.

3. The servovalve system as recited in claim 2 in which a null current represents approximately one-half of the maximum rated current on a time average basis and wherein at null current the jet pipe is in the balanced flow deflected position with the spool in the midpoint position and no pressurized fluid is delivered to or ported away from the servopiston unit, thereby locking the piston in place.

4. The servovalve system as recited in claim 3 wherein the delivery of the pressurized fluid to the servopiston unit represents the output of the servovalve and wherein the servovalve output over a primary operating range is basically linear.

5. The servovalve system as recited in claim 4 wherein the primary operating range includes from about 20% to about 80% of the rated input current.

6. The servovalve system recited in claim 5 wherein when the input current is less than about 20% or greater than about 80% of rated input current no pressurized fluid is delivered to or ported away from the servopiston unit, thereby locking the piston in place.

7. The servovalve system recited in claim 4 wherein the primary operating range comprises from 20% to 80% of the rated input current.

8. The servovalve system recited in claim 4 wherein the primary operating range comprises from 30% to 70% of the rated input current.

* * * * *